(12) United States Patent
Gallegos-Lopez et al.

(10) Patent No.: US 6,850,033 B1
(45) Date of Patent: Feb. 1, 2005

(54) SYSTEM AND METHOD FOR CLAMP CURRENT REGULATION OF INDUCTION MACHINES

(75) Inventors: Gabriel Gallegos-Lopez, Alexandria, IN (US); Fani S. Gunawan, Westfield, IN (US); James E. Walters, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/649,447

(22) Filed: Aug. 26, 2003

(51) Int. Cl.[7] ............................................... H02P 5/28
(52) U.S. Cl. ...................... 318/807; 318/801; 318/800
(58) Field of Search .............................. 318/800, 807, 318/803, 811, 808, 809, 810

(56) References Cited

U.S. PATENT DOCUMENTS

| | | | | |
|---|---|---|---|---|
| 4,707,651 | A | * 11/1987 | Schauder | 318/800 |
| 6,163,128 | A | 12/2000 | Hiti et al. | 318/722 |
| 6,590,361 | B2 | 7/2003 | Walters et al. | |
| 2002/0145837 | A1 | 10/2002 | Krefta et al. | 361/23 |
| 2003/0052643 | A1 | * 3/2003 | Sweo | 318/801 |

OTHER PUBLICATIONS

Harnefors et al, "Torque–Maximizing Field–Weakening Control: Design, Analysis, and Parameter Selection," IEEE Transactions on Industrial Electronics, vol. 48, No. 1, Feb. 2001.

Seibel et al, "Field Oriented Control of an Induction Machine with DC Link and Load Disturbance Rejection," Rockwell Automation, Allen–Bradley Standard Drives Business, 6400 W. Enterprise Dr., Mequon, Wisconsin 53092.

Monti, "C167CS–Based Induction Motor Drive with Field Weakening Region," (Applications), Dipartimento di Elettrotecnica, Politecnico di Milano, pp. 21–27.

Moore et al, "Effect on Vehicle Performance of Extending the Constant Power Region of Electric Drive Motors," SAE Technica Paper Series 1999–01–1152, pp. 1–5.

Hodkinson, "Operating Characteristics of a 45KW Brushless DC Machine," www.polaron–group.co.uk/nelco/vehicles/paper5.html.

E–learning Resources in Microelectronics, "Control of Induction Motors," www.bolton.ac.uk/technology/mind/paderborn/motors/induction/induction–motor.html.

* cited by examiner

Primary Examiner—Karen Masih
(74) Attorney, Agent, or Firm—Jimmy L. Funke

(57) ABSTRACT

A device to regulate current produced by an induction machine responsive to a plurality of phase current signals. The motor produces torque for application on a shaft. A processing and drive circuit responsive to a direct current command signal and a quadrature current command signal produces phase current signals for input to the motor. A command circuit responsive to the phase current signals, an angular position of said shaft, and a voltage input command signal to produce a direct current error signal and a quadrature current error signal. A control circuit responsive to the direct and quadrature current error signals produces the direct voltage signal command and the quadrature signal command. The control circuit has a direct and quadrature proportional gain, integrator and clamp circuits. An algorithm produces limited or clamped voltage modulation index signals to obtain maximum efficiency and maximum torque per ampere in the speed range.

26 Claims, 3 Drawing Sheets ically pointed out in the appended claims, taken in conjunc-
SYSTEM AND METHOD FOR CLAMP CURRENT REGULATION OF INDUCTION MACHINES

BACKGROUND OF THE INVENTION

1. Technical Field

The present invention is directed generally to electromechanical machines, and, in particular, to a system and a method for current regulation in the field-weakening operation of induction machines.

2. Description of the Related Art

In the control of inverter-driven induction machines, field weakening is often used to lower the inverter voltage rating for a given application. Without field weakening the inverter manufacturer would have to use components rated to handle higher levels of voltage for that given application. This would undesirably add incremental costs to the drive system. During high speed operation, the phase current may be applied to the machine windings in advance of the phase electromotive force. To control the electromotive force, the D axis current is decreased inversely with speed.

It is known to provide a flux weakening algorithm by the use of a number of look-up tables to produce the reference Q-axis and D-axis currents. However, the use of look-up tables requires the creation of numerous and cumbersome data structures within the look-up tables themselves to handle all possible situations in the system and its environment.

Accordingly, there is a need for a current control system that minimizes or eliminates one or more of the above-mentioned shortcomings.

SUMMARY OF THE INVENTION

The invention is based upon the discovery that in current control for induction machines, a limiter in the current regulator of a proportional integral control that clamps the current regulators at the available voltage vector with appropriate phase preventing loss of current regulation, maximizes the efficiency of the machine and produces maximum torque in the field weakening region. The arrangement is capable of adjusting to the true base speed of the machine as the DC-link voltage varies.

The invention is directed to a device for regulating current produced in an induction machine responsive to a plurality of phase current signals for producing torque at the machine output shaft. The device includes a processing and drive circuit responsive to a direct current command signal and a quadrature current command signal for producing a plurality of phase current signals at the input to the machine. A command circuit is responsive to the phase current signals and an angular position of the shaft for producing a direct current error signal and a quadrature current error signal. A control circuit is responsive to the direct and quadrature current error signals to produce the direct and quadrature voltage modulation index signals. The control circuit includes a proportional controller and integrator responsive to each of the direct and quadrature current error signals. The proportional controller and integrator outputs are summed and fed back to the command circuit. A limiter is located in the feed back loop to clamp the summed outputs at the available voltage vector and provide appropriate phase.

The method according to the invention limits current regulators to an available voltage magnitude, voltage angle delta and a slip frequency range for assuring that the system does not exceed the available voltage and that the machine efficiency is maximized and that maximum torque is produced in the field-weakening region.

Other features, objects and advantages of the present invention will become apparent to one of ordinary skill in the art from the description that follows and may be realized by means of the instrumentalities and combinations particularly pointed out in the appended claims, taken in conjunction with the accompanying drawings.

BRIEF DESCRIPTION OF THE DRAWINGS

The present invention will now be described, by way of example, with reference to the accompanying drawings, in which.

DESCRIPTION OF THE INVENTION

The invention is directed to a method and apparatus for current control in induction machines. The method is specifically designed to produce additional functionality in the field-weakening region.

To extend the operational speed range of induction machines, it is necessary to de-flux the machine by applying reduced current in the synchronous D-axis, Ids. The advantage of the method is that it applies the appropriate amount of current at each operating point across the entire speed range of the machine, that is, in the constant torque region and in the field-weakening region.

An important feature of the invention is that when the current regulator exceeds the available voltage, the system decreases Ids. Furthermore, when the voltage angle exceeds the maximum voltage angle delta for motoring mode, or is less than the minimum voltage angle delta for generating mode, the system clamps the angle to the maximum delta angle for motoring mode or the minimum delta angle for generating mode, and the slip frequency is kept to the value that provides maximum torque for motoring or minimum torque for generating mode. As a result, the current regulator does not run out of voltage, maximizes the machine efficiency and provides maximum torque in the field-weakening region for motoring mode, or minimum torque in the field weakening region for generating mode.

It is important to note that the base-speed of a machine changes significantly depending upon variations in the DC-link voltage. However, the invention is able to properly identify the base-speed so that the constant torque region is extended to as high a speed as possible.

Figure 1:
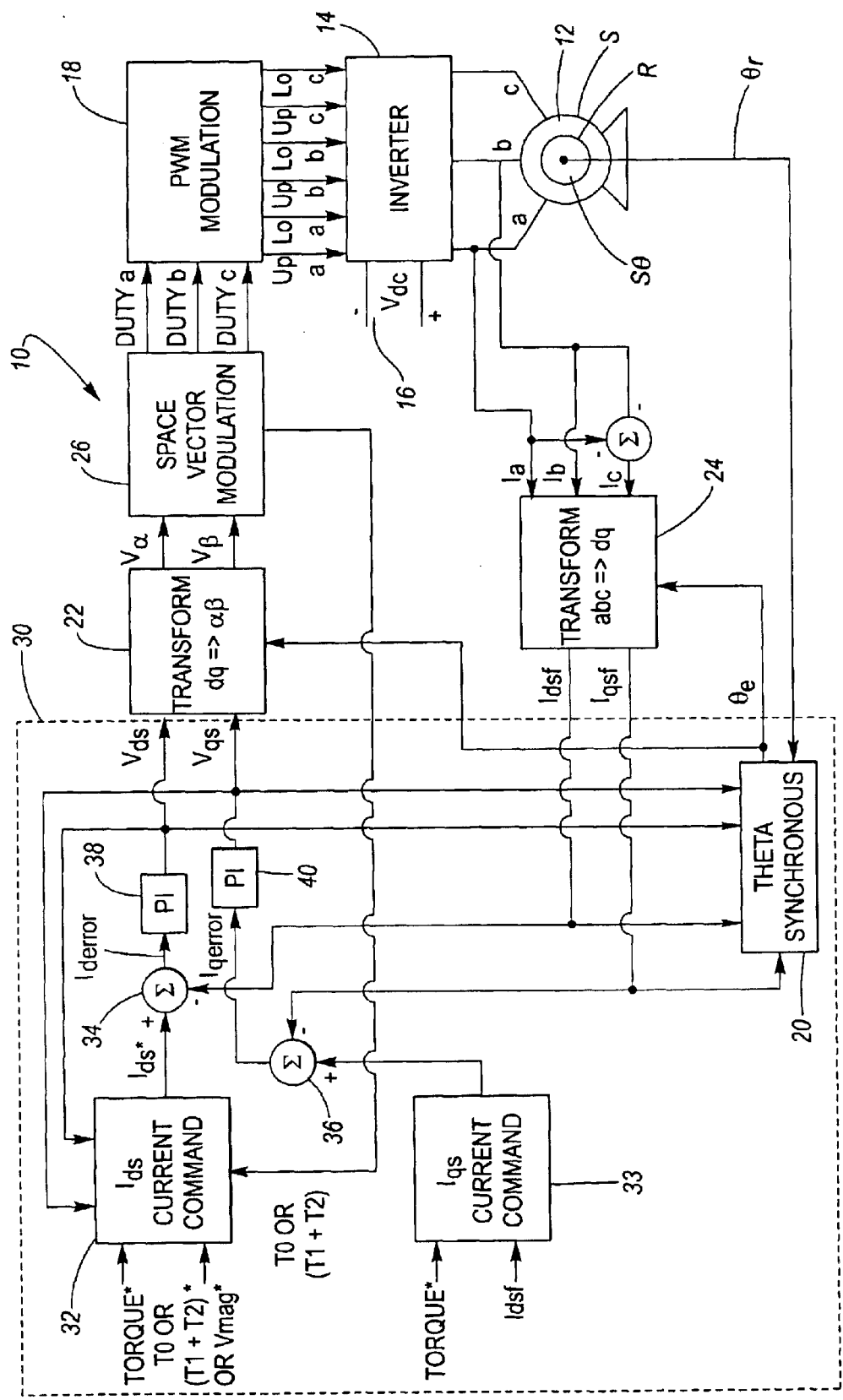
FIG. 1 is a schematic block diagram of an induction machine drive employing exemplary control system according to the invention.

FIG. 1 shows a block diagram of an exemplary system 10 according to the invention. The apparatus is adapted for controlling an induction machine 12, e.g. a motor/generator, having a stator S and a rotor R for driving a shaft. The machine is driven by a three phrase inverter 14 coupled to a DC-link voltage source 16 (Vdc). Vdc is sometimes herein after referred to as the link voltage. A pulse width modulator (PWM) 18 drives the inverter in a known way.

Control of the induction motor may be implemented by a digital signal processor (DSP). Such DSPs are known and are arranged to be responsive to various inputs for producing control outputs, for driving the motor according to the invention. A sensor Sθ is coupled to the motor 12 to produce a sensor rotor position signal θ$_r$. The sensed rotor position signal θ$_r$ is coupled to a theta synchronous block 20 which produces synchronous angle signal θ$_e$. The output of block 20 is coupled to coordinate transform circuits 22 and 24, as shown. The coordinate transform 22 transforms D-axis and Q-axis modulation index signals to produce modulation index signals in stationary coordinates α and β. The modulation index signals in the stationary coordinate frame are coupled to and modulated by a space vector modulator 26 in a known manner to produce outputs that drive the voltage PWM modulator 18. PWM modulation block 18 generates the gate drive signal for inverter 14, which provides voltage to machine 12.

Motor drive phase currents a, b and c to the machine 12 from inverter 14 drive the motor 12. These are coupled in feed back relation to the coordinate transform 24 which transforms motor drive stationary current from the inverter 14 to direct and quadrature synchronous axis signals Idsf and Iqsf. These signals are likewise coupled to the theta synchronous block 20 as shown, and to adders 34 and 36 in the current clamp regulator circuit 30.

The current clamp regulator 30 includes an Ids current command block 32 and an Iqs current command block 33 which calculate direct and quadrature current commands Ids* and Iqs* respectively (Commands are designated by an asterisk (*)). The current commands Ids* and Iqs* are summed with the respective transformation feedback output Idsf and Iqsf at summing nodes 34 and 36 respectively. Ids* and Iqs* are each coupled to the non inverting inputs of respective summing nodes 34 and 36. Likewise Idsf and Iqsf are coupled to the inverting inputs of respective nodes 34 and 36. The summed signals respectively represent the D-axis current error signal Id error and the Q-axis current error signal Iq error. The error signals are coupled to corresponding proportional-integral (PI) current regulators 38 and 40. The outputs of the PI regulators represent the D-axis voltage Vds and the Q-axis voltage Vqs respectively. These signals are coupled to the transform circuit 22 for appropriate transformations as noted above. The voltage signals Vds and Vqs are also fed back to the Ids current command block 32 as shown and are coupled to the theta synchronous block 20.

The PI current regulators 38 and 40 include limiters for clamping the D-axis and Q-axis modulation index signals Vds and Vqs to some limited voltage with a given limited angle delta in order to prevent an undesirable loss of current regulation, to maximize machine efficiency and to provide maximum torque in the field weakening region.

The current command circuit 32 receives a Torque* command input, and a zero vector time control command signal T0* as an input. Alternatively, the current command circuit 32 may receive the addition of time 1 and time 2 vectors as a control signal, i.e., (T1+T2)* or the voltage magnitude command signal V$_{MAG}$*. The Ids current command circuit 32 receives a feedback signal corresponding to the zero vector time T0 from space voltage modulator 26. Feedback signal from the space modulator 26 may be in the form of the sum of vectors 1 and 2 i.e. (T1+T2) or according to a known relationship, namely V$_{MAG}$=$\sqrt{Vds^2+Vqs^2}$.

Figure 2:
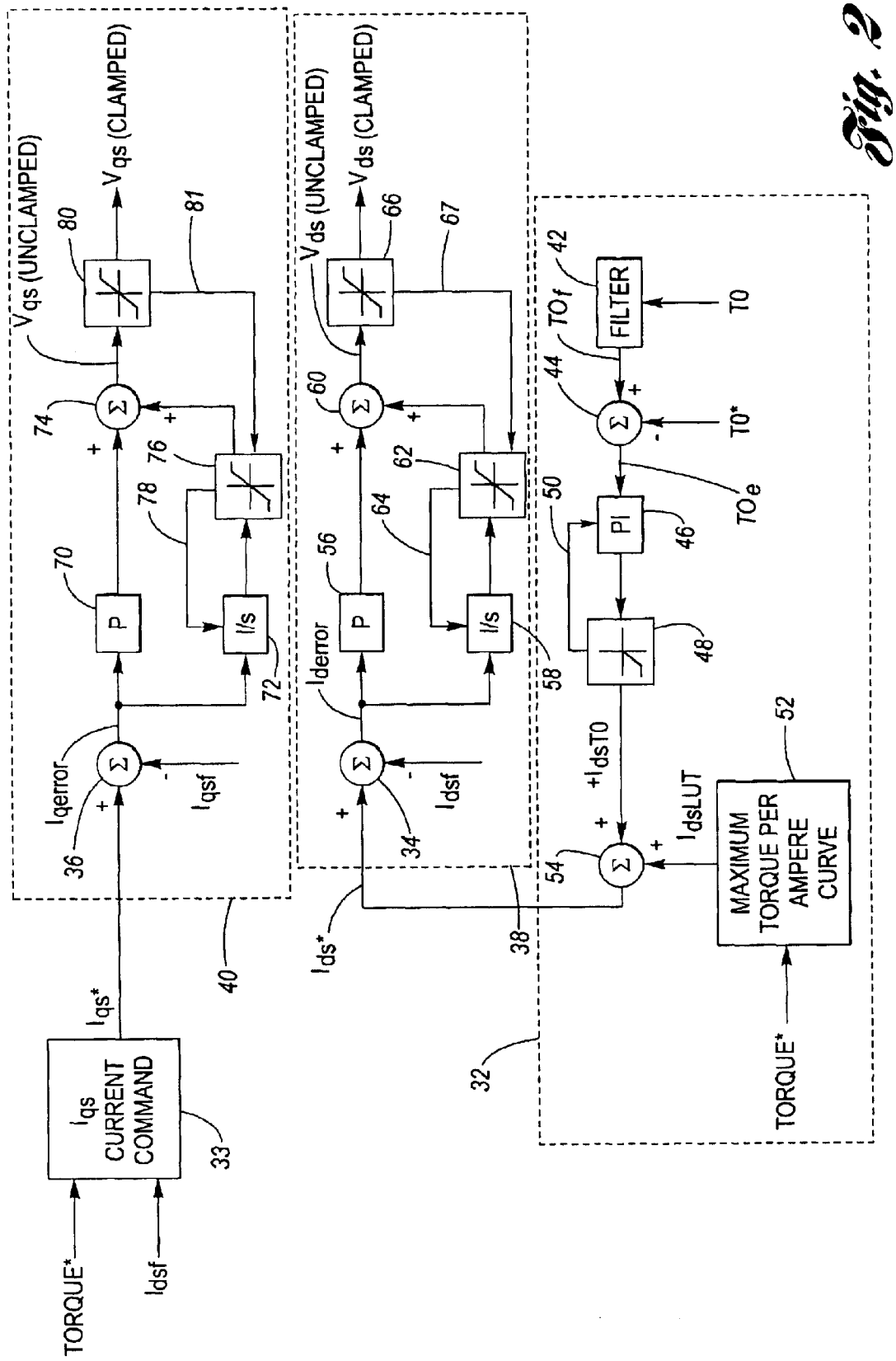
FIG. 2 illustrates an exemplary current clamp command employed in the circuit of FIG. 1.

FIG. 2 illustrates a block diagram of the clamp arrangement employed in the proportional integrators 38 and 40. As illustrated, for the D-axis, the zero time vector T0 is fed back from the space vector modulator 26 and is input to a ripple filter 42. The output of filter 42 is time zero feedback output T0f which is summed at the non-inverting input of node 44.

The zero time vector control T0* is coupled to the inverting input of the node 44. The difference is error signal T0e which is coupled to a proportional integrator (PI) circuit 46 and which feeds limiter or clamp 48. The clamp 48 has a feedback loop of 50 which is coupled to the PI circuit 46 as shown.

The limiter 48 produces an output IdsT0 which is limited to values less than or equal to zero.

The output IdsT0 of the limiter 48 is summed at node 54 with a look up table (IdsLUT) output for Ids from maximum torque per amp curve block 52 both of which are non-inverted, as shown, to produce the D axis current control signal Ids*. Block 52 is fed by the Torque* control signal.

The Ids* signal and Idsf feedback signal are summed at the respective non-inverting and inverting inputs of node 34 to produce Id error, which is coupled to parallel connected proportional circuit 56 and integrating circuit 58. Proportional circuit 56 produces one output which is coupled to the non-inverting input of summing node 60. The integrating circuit 58 also coupled to the node 34 is, in turn, coupled to a clamp or limiting circuit 62 having a feedback loop 64 as shown.

The proportional circuit 56 controls the transient components of the Id error signal, and the integrating circuit 58 controls steady state components of the Id error signal. The clamp 62, when implemented, is used to limit the steady state value within an allowable range. The output of the clamp 62 is coupled to another non-inverting input of the summing node 60. The output of the node 60 is the unclamped D-axis modulation index signal Vds. This signal is coupled to clamp or limiting circuit 66, and when engaged, the output of the clamp 66 is the clamped D-axis modulation index signal Vds. As shown in FIG. 1, the Vds signal is coupled to the transform circuit 22 and is fed back to the current command circuit 32 and the theta synchronous block 20. The second clamp 66 limits the overall output Vds.

Iqs current command block 33, FIG. 2., produces Iqs* command signal in response to the torque command signal Torque* and feedback signal Idsf from transform block 24. The Q-axis reference or command signal Iqs*, FIG. 2, is coupled to the non-inverting input of the node 36. The Iqsf feedback signal from the transform circuit 24 is coupled to the inverting input of the node 36. The node 36 produces an Iq error signal. The Iq error signal is coupled to proportional controller 70 and the integrator 72. Proportional circuit 70 produces transient signals and the integrating circuit 72 produces steady state signal. The output of the proportional control 70 is coupled to the non-inverting input of a node 74. The output of the integrator 72 is coupled to a clamp 76. The clamp 76, when implemented, is used to limit the steady state value within an allowable range. The output of the clamp 76 is coupled to another non-inverting input of summing node 74 and is fed back over line 78 to integrator 72, as shown. The signals are summed at node 74, and the output of the node 74 is the unclamped Vqs. This signal is coupled to clamp or limiting circuit 80, and when engaged, the output of the clamp is clamped Q-axis modulation index signal Vqs. This, in turn, is coupled to the transform circuit 22 and is fed back to the current command circuit 32 and the theta synchronous block 20 as shown in FIG. 1. The second clamp 80 limits the overall output Vqs.

When activated, clamps 66 and 80 limit the overall D and Q axis signals. Clamps 62 and 76 limit or clamp the steady state signals. The limiting or clamping circuits illustrated in FIG. 2 thereby result in the protections and versatility afforded by the circuit of the present invention.

Activation of clamps 66 and 80 occurs when the unclamped Vds, in combination with unclamped Vqs is out of a selected voltage vector range. i.e. magnitude and direction (delta angle). Once engaged, clamps 66 and 80 corresponding clamps 62 and 76 are operative through feedback lines 67 and 81 to implement an algorithm exemplified in FIG. 3 to limit Vds and Vqs to the clamped values as shown.

Figure 3:
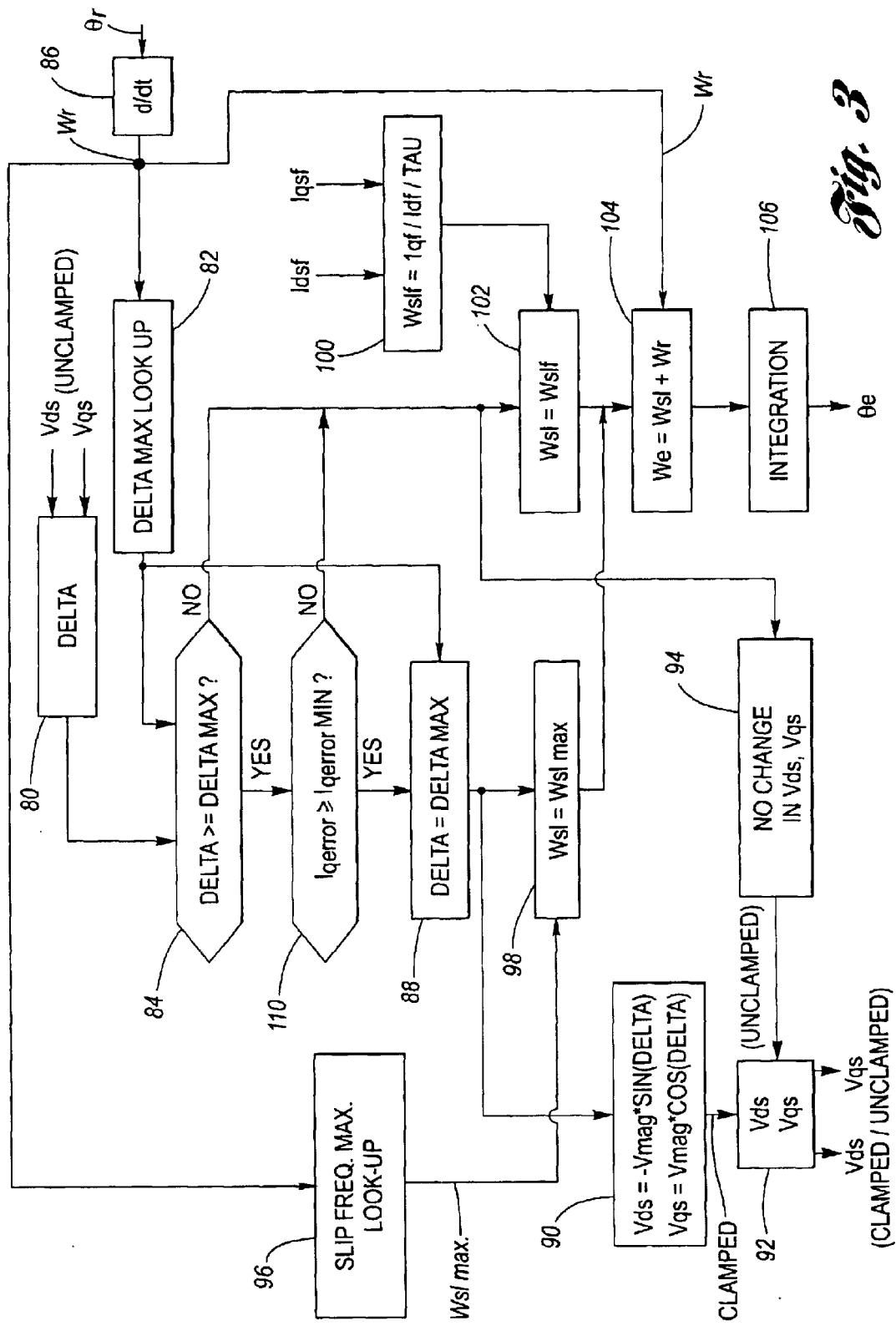
FIG. 3 is a flow chart showing the implementation of a limiting algorithm employed in the circuit of FIG. 2.

FIG. 3 is a flow chart which illustrates a flow chart for implementing an algorithm for initiating clamping action of the apparatus of the present invention. The unclamped direct and quadrature voltage signals Vds and Vqs are used to calculate the delta angle in block 80. The delta angle is (arc tan (−Vds/Vqs)). The delta angle signal of block 80 is compared with a delta max lookup signal of block 82 in comparator block 84. The delta max look-up signal is derived by examining the rotor speed Wr produced by differential circuit 86 in response to the rotor position signal $\theta_r$, as shown.

If the delta angle is greater than or equal to the delta max, as sensed at block 84, then Vds and Vqs are recalculated via blocks 110, 88, 90 and 92, as shown. The output of block 92 represents the clamped D and Q axis signals. The function of blocks 110 and 88 are discussed below. If the delta angle is less than the delta max, as determined at block 84, then a No Change output is produced at block 94. The No Change output is coupled to the block 92 which produces Vds and Vqs outputs which are unclamped.

As further illustrated in FIG. 3, if the delta angle is greater than the delta max, as determined in block 84, then the Slip Frequency Max. look up block 96 provides the slip frequency Wslmax in response to the rotor speed signal Wr derived from differentiating block 86. The maximum slip frequency of block 96 sets the value in block 98 and inputs this to block 104 for summation with the rotor frequency Wr. If the delta angle is not greater than delta max (Block 84), then the slip frequency Wsl is calculated from feedback currents Idsf and Iqsf via blocks 100 and 102. The slip frequency is added to rotor frequency to obtain synchronous frequency We in block 104. The output of 104 is integrated at 106 to produce a synchronous position output signal $\theta_e$. The synchronous position signal $\theta_e$ is employed as an input to transform circuits 22 and 24 (FIG. 1).

In addition, block 110 may be responsive to the affirmator output of Delta max block 84. Block 110 determines if the Iq error signal is greater than or equal to a minimum value of the Iq error. An affirmative comparison is coupled to block 88 where Delta Angle is set to Delta Max Angle which is supplied from block 82. Vds and Vqs are recalculated in block 90 and output at block 92 as noted above. A negative comparison is coupled to block 94 where upon Vqs and Vds experience No Change.

The foregoing arrangement is for a motoring mode. Accordingly, if the motor goes to the generating mode, delta and slip frequencies change sign and the comparison becomes a less than calculation in blocks 84 and 110 of FIG. 3

From the foregoing, it can be seen that a new and improved device to regulate current produced by an induction machine has been provided. It is to be understood that the description of the exemplary embodiments is merely illustrative of some of the many specific embodiments that represent applications of the principles of the present invention. Other arrangements would be evident to those skilled in the art without departing from the scope of the invention as defined by the following claims.

What is claimed is:

1. A device to regular current produced by an induction machine comprising:
   an induction motor responsive to a plurality of phase current signals, said motor producing torque for application on a shaft;
   a processing and drive circuit responsive to a direct current command signal and a quadrature current command signal, said processing and drive circuit for producing a plurality of phase current signals for input into said induction motor;
   a command circuit responsive to said plurality of phase current signals, to an angular position of said shaft, and to a current input command signal for producing a direct current error signal and a quadrature current error signal;
   a control circuit responsive to the direct and quadrature current error signals for producing direct and quadrature voltage signals; and
   a limiter for limiting the direct and quadrature voltage signals to a selected level.

2. The device of claim 1 including a D-axis current command circuit responsive to a torque command, Torque*, one of a zero time vector, T0*, a time for voltage vector, T1+T2*, and a voltage magnitude Vmag* and one of a feedback for zero time vector, T0, time for voltage vector, T1+T2, and voltage magnitude Vmag.

3. The device of claim 1 further including a transform circuit responsive to phase current signals of the drive circuit to produce direct and quadrature synchronous current feedback signals Idsf and Iqsf.

4. The device of claim 1 including a Q-axis current command circuit responsive to a torque command, Torque*, and a feedback D-axis current, Idsf, for producing a Q-axis current command.

5. The device of claim 1 wherein said command circuit includes, a control circuit responsive to said direct and quadrature current error signals to produce said direct voltage command signal and said quadrature command signal, said control circuit having a first portion and a second portion, wherein said first portion includes a first pathway having a first proportional gain and a second pathway having a first integrator and a first clamp, and a third pathway having a first summing node and a second clamp, wherein said second portion includes a fourth pathway having a second proportional gain and a fifth pathway having a second integrator and a third clamp and a sixth pathway having a second summing node and a fourth clamp.

6. The device of claim 5 wherein said first portion produces said direct voltage command signal, and said first and second clamps contain said voltage Vds MIN.≦Vds≦Vds MAX.

7. The device of claim 5 wherein said second portion produces said quadrature voltage command signal, and said third and fourth clamps contain said voltage Vqs MIN.≦Vqs≦Vqs MAX.

8. The device of claim 1 wherein said direct current error signal is produced by subtracting a direct synchronous current feedback signal from a direct synchronous current command signal.

9. The device of claim 2 further including a proportional integrator responsive to a zero time vector feedback T0 and a zero time vector command T0* for producing an output, and a limiter responsive to the output for producing a D-axis time zero signal, IdsT0, between zero and a selected value; a maximum torque per ampere circuit for producing a D-axis current look up signal, IdsLUT; a summing circuit responsive to the D-axis time zero signal and the D-axis current look up signal to produce a D-axis current command Ids*.

10. The device of claim 1 further comprising in a motor mode means for determining the angle representing a sensed direction of the vector, means for determining a maximum angle of said vector and means for recalculating the voltages to a limited value based on the maximum angle and setting the slip frequency to a maximum value which is a function of the rotor speed, when the sensed angle exceeds the maximum angle.

11. The device of claim 1 further comprising means for calculating the slip frequency as a function of direct and quadrature synchronous current feedback signals.

12. The method of claim 1 further comprising means for determining in a generating mode the angle representing a sensed direction of the vector, means for determining a minimum angle of said vector and means for recalculating the voltages to a limited value based on the minimum angle and setting the slip frequency to a minimum value which is a function of the rotor speed, when the sensed angle is less than the minimum angle.

13. A method to regulate current produced by an induction machine comprising limiting each of the respective direct and quadrature voltages Vds and Vqs to selected value range which together represent the magnitude and direction of a resulting voltage vector.

14. The method of claim 13, wherein the vector comprises $\sqrt{Vds^2+Vqs^2}$, or $K(1-T0)$, or $K(T1+T2)$.

15. The method of claim 13 wherein the direction of the vector comprises
arc tan–Vds/Vqs, the voltage angle relative to Q axis.

16. The method of claim 13 further comprising calculating a synchronous angle $\theta_e$ by differentiating a rotor position signal to derive rotor speed, selecting a maximum slip frequency based on the rotor speed, adding the rotor speed and slip frequency to produce synchronous frequency speed and integrating the synchronous frequency to produce a synchronous position angle $\theta_e$.

17. The method of claim 13 further comprising determining in a motor mode the angle representing a sensed direction of the vector, determining a maximum angle of said vector and recalculating the voltages to a limited value based on the maximum angle and setting the slip frequency to a maximum value which is a function of the rotor speed, when the sensed angle exceeds the maximum angle.

18. The method of claim 13 further comprising calculating the slip frequency as a function of direct and quadrature synchronous current feedback signals.

19. The method of claim 13 further comprising determining in a generating mode the angle representing a sensed direction of the vector, determining a minimum angle of said vector and recalculating the voltages to a limited value based on the minimum angle and setting the slip frequency to a minimum value which is a function of the rotor speed, when the sensed angle is less than the minimum angle.

20. A method to regulate current produced by an induction machine comprising the steps of:
inputting a direct current command signal and a direct current feedback signal into a first circuit;
subtracting said direct current feedback signal from said direct current command signal to produce a first direct current error;
inputting said direct current error signal into a first proportional controller to produce a first direct voltage signal command;
inputting said direct current error signal into a first integrator to produce a second direct voltage signal command;
inputting said second direct voltage signal command into a first limiter to produce a third direct voltage signal command;
adding said third direct voltage signal command with said first direct voltage signal command to produce an unclamped direct voltage signal command;
inputting said unclamped direct voltage signal command into a second limiter to produce a direct synchronous voltage signal command;
inputting a quadrature current feedback signal and a quadrature current command signal into a second circuit;
subtracting said quadrature current feedback signal to said quadrature current command signal to produce a quadrature current error signal;
inputting said quadrature current error signal into a second proportional controller to produce a first quadrature voltage signal command;
inputting said quadrature current error signal into a second integrator to produce a second quadrature voltage signal command;
inputting said second quadrature voltage signal command into a third limiter to produce a third quadrature voltage signal command;
adding said third quadrature voltage signal command with said first quadrature voltage signal command to produce an unclamped quadrature voltage signal command; and
inputting said unclamped quadrature voltage signal command into a fourth limiter to produce a quadrature synchronous voltage signal command.

21. The method of claim 20 wherein said third direct voltage signal command represents a steady state value and said first limiter clamps the value of said third direct voltage signal command to be no greater than a selected maximum value and to be no less than a selected minimum value.

22. The method of claim 20 wherein said second limiter clamps the value of unclamped said direct voltage signal command to be no greater than a selected maximum value and to be no less than a selected minimum value.

23. The method of claim 20 wherein said third direct quadrature voltage signal command represents a steady state value and said third limiter clamps the value of said third quadrature voltage signal command to be no greater than a selected value and to be no less than a selected minimum value.

24. The method of claim 20 wherein said fourth limiter clamps the value of said unclamped quadrature voltage signal command to be no greater than a selected value and to be no less than a selected minimum value.

25. A device to regulate current produced by an induction machine comprising:
an induction motor responsive to a plurality of phase current signals, said motor producing torque for application on a shaft;
a processing and drive circuit responsive to a direct current command signal and a quadrature current command signal, said processing and drive circuit for producing a plurality of phase current signals for input into said induction motor;
a command circuit responsive to said plurality of phase current signals, to an angular position of said shaft, and to a current input command signal for producing a direct current error signal and a quadrature current error signal; and a control circuit responsive to said direct and quadrature current error signals, said control circuit having a first portion and a second portion, wherein said first portion includes a first proportional integrator and a first clamp means connected thereto, for producing the direct voltage signal command, said second portion includes a second proportional integrator and second clamp means connected thereto for producing the quadrature direct voltage signal command.

26. A method for regulating current produced by an induction machine driven by direct and quadrature signals comprising the steps of:

subtracting a direct current signal from a direct current signal command to produce a first direct error signal;

proportionally integrating the direct error signal to produce the proportionally integrated direct signal command;

limiting the proportionally integrated first direct signal command to produce the direct signal command;

subtracting a quadrature current signal from a quadrature current signal command to produce a quadrature direct error signal command;

proportionally integrating the quadrature signal command to produce a proportionally integrated quadrature signal command;

limiting the proportionally integrated quadrature signal to produce a quadrature signal command.

* * * * *